United States Patent [19]

Takano

[11] Patent Number: 4,545,656
[45] Date of Patent: Oct. 8, 1985

[54] FOCUS ADJUSTING DEVICE FOR BINOCULAR

[75] Inventor: Katuto Takano, Hatogaya, Japan

[73] Assignee: Toei Optical Industries Co. Ltd., Saitama, Japan

[21] Appl. No.: 532,908

[22] Filed: Sep. 16, 1983

[51] Int. Cl.⁴ .......................... G02B 7/04; G02B 23/00
[52] U.S. Cl. ..................................... 350/552; 350/555
[58] Field of Search ............... 350/552, 145, 146, 555, 350/556

[56] References Cited

U.S. PATENT DOCUMENTS 4,066,329  1/1978  Van Exel .......................... 350/552
4,470,671  11/1984  Ishida ................................. 350/552

FOREIGN PATENT DOCUMENTS 452853  5/1913  France ................................. 350/552

Primary Examiner—Jon W. Henry
Attorney, Agent, or Firm—Fred Philpitt

[57] ABSTRACT

This focus adjusting device comprises a center shaft and being formed with a horizontal through hole in its lower part, a lever cam made of cylindrical shaft and being formed with a screw thread portion in its inner cylinder, and said lever cam being inserted into the inner cylinder of the center shaft and an adjusting knob being inserted into an outer cylinder of the center shaft, whereby the lever cam and the adjusting knob are interlockingly connected by a set screw through the horizontal hole of the center shaft, and the lever shaft is screwed to the screw thread portion of the lever cam at its screw thread portion, and the lever shaft supports an eyepiece lens cylinder.

4 Claims, 8 Drawing Figures

FOCUS ADJUSTING DEVICE FOR BINOCULAR

BACKGROUND OF THE INVENTION

This invention relates to a focus adjusting device for binocular, and more particularly to a focus adjusting device for binocular in which the center shaft made of cylindrical shaft is formed with a horizontal through hole at a predetermined location of its lower part, and a lever cam made of cylindrical shaft is rotatably inserted into an inner cylinder of the center shaft, and an adjusting knob is rotatably inserted into an outer cylinder of the center shaft, and the lever and the adjusting knob are connected by a set screw through the horizontal through hole of the center shaft so as to move interlockingly, and the lever cam is formed with a screw thread portion in its inner cylinder thereby screwing the thread portion of the lever shaft.

The conventional focus adjusting device of the binocular was constructed in such way that a control lever was shifted vertically by a screw thread mechanism, but the structure forming the focus mechanism of this kind was formed by providing thread in the inner cylinder portion of the center shaft and providing a screw thread portion for screwing with the screw thread portion of the center shaft on a lever shaft and screwing the screw thread portion of the lever shaft with the screw thread portion of the inner cylinder portion of the center shaft. In this kind of the structure, the provision of a screw thread of high pitch in the inner cylinder of the center shaft, for example, a multi-thread screw thread advancing by 30 millimeters in one rotation was technically impossible, and the formation of the screw thread of moderate pitch was regarded inevitable, and as a result, the operation was extremely slow, and in order to shift from an upper limit to a lower limit of the eyepiece lens, it was necessary to turn the adjusting knob many times, and adverse effects accompanied by the rotating operation of the adjusting knob were numerous in various ways which were drawbacks.

As described in the foregoing, as an effort of eliminating the slow operation in the focus adjustment that employs the conventional screw thread mechanism, a focus adjusting device disclosed in U.S. Pat. No. 4,066,329 was proposed. However, this device employed the system of guiding a cam pin formed on a cam shaft by an inclined hole provided on a center shaft so that even if a control lever was rapidly shifted vertically, a fixing and holding force of the control lever was extremely weak which was a drawback. For example, the control lever was naturally dropped as the weight of the eyepiece lens cylinder or the like was applied, or the control lever was shifted by a mere contact of the eyepiece lens slightly on the face of the user during the observation which caused the focus out of order or a phenomenon of dropping the control lever simply when the operation of eye interval by the bodytube of the binocular occurred which put the once obtained focus out of order which, as a result, required frequent operation of adjustment of focus and which were cumbersome matters for the users, and easy occurrence of the displacement of focus resulting from the lack of the fixing and holding force of the control lever was a fatal drawback for the binocular.

SUMMARY OF THE INVENTION

This invention is to provide a focus adjusting device employing the screw thread mechanism, and is to form the focus adjusting device having the screw thread mechanism as a structure capable of forming the parts by cast molding, and namely, to form a focus adjusting device as the structure added with a lever cam made of cylindrical shaft relative to the center shaft, adjusting knob and lever shaft.

This invention is capable of molding the lever cam by cast molding since the lever cam is made of cylindrical shaft and as a result, is to provide the lever cam formed with the screw threads capable of advancing by 30 millimeters in one rotation, namely, 30 millimeters in one lead, for example, screw thread diameter 8 millimeters, lead angle 50 degrees and 12-thread, and the lever cam formed with multi-thread screw threads advancing by 30 millimeters in one rotation makes facilitates the adjusting operation of the adjusting knob by slightly turning it in order to shift the eyepiece lens from the upper limit to the lower limit.

This invention is to provide the focus adjusting device employing the screw thread mechanism and assures the fixing of the lever shaft and which, namely, assures the fixing and holding force of the focus of the eyepiece lens.

This invention is to provide the adjusting knob capable of the focus adjusting operation by slightly turning the adjusting knob in order to shift the eyepiece lens from the upper limit to the lower limit by the focus adjusting mechanism provided with the lever cam formed with the screw thread portion advancing by 30 millimeters in one rotation, and at the same time, being used effectively in the focus adjusting operation.

DETAILED DESCRIPTION OF THE INVENTION

Figure 1:
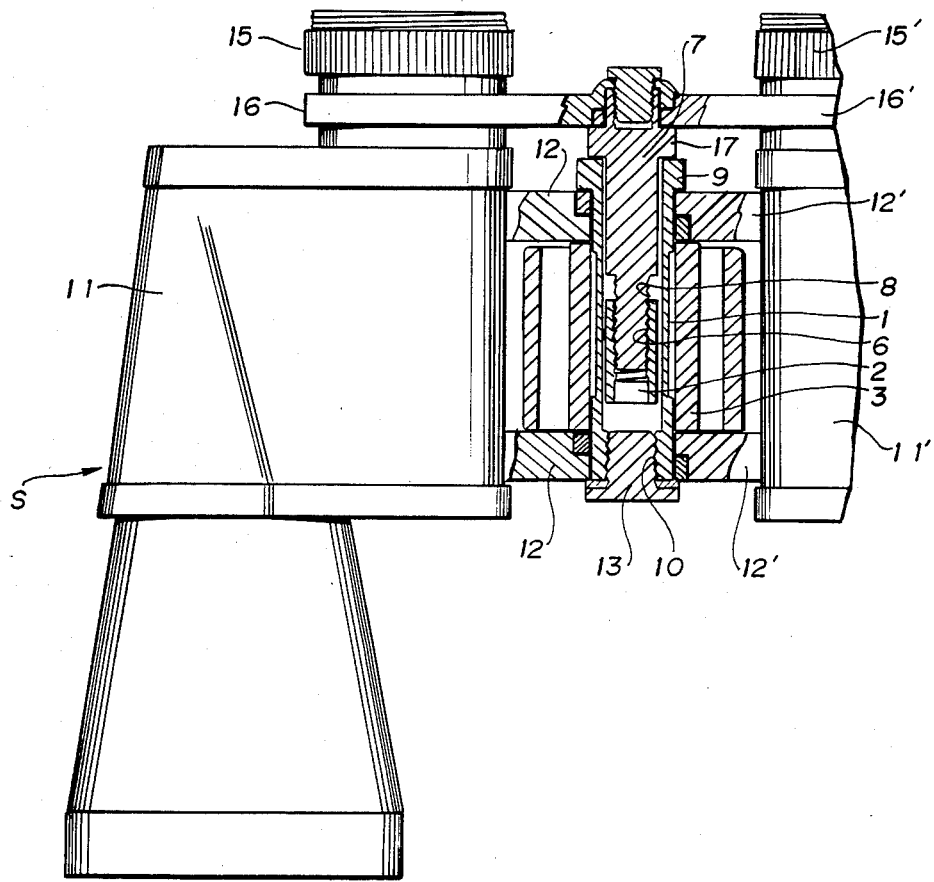
FIG. 1 is an elevational view of a binocular illustrating the part of a focus adjusting mechanism in cross section.
Figure 2:
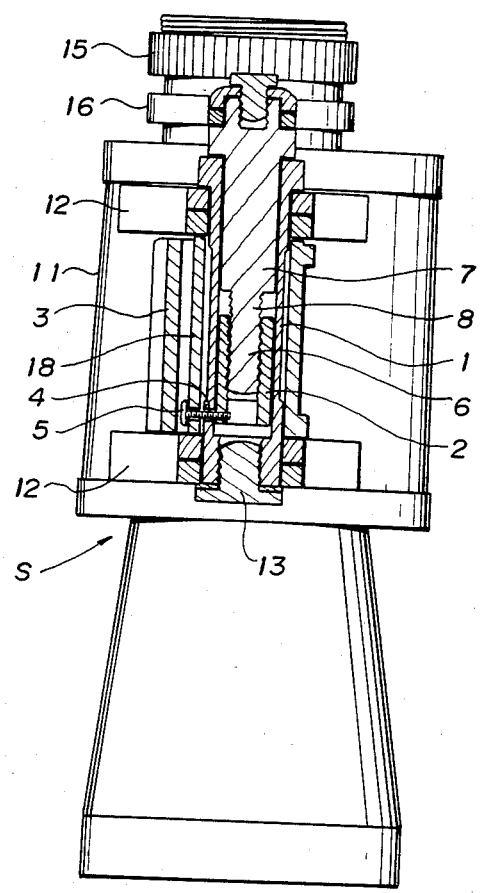
FIG. 2 is an enlarged cross sectional view of an essential part illustrating an assembly of the focus adjusting mechanism.
Figure 3:
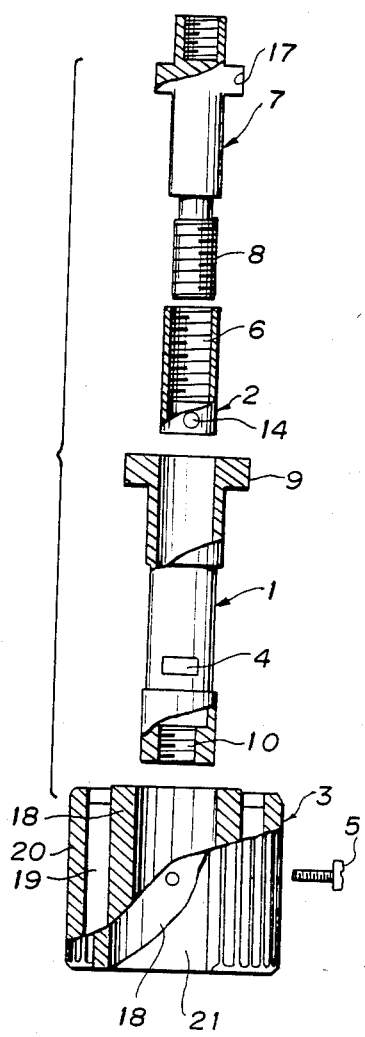
FIG. 3 is its decomposed cross sectional view.

The binocular according to this invention is illustrated by an ordinary letter S, and a focus adjusting mechanism of the binocular S is constructed in such way that a lever cam 2 is rotatably inserted into an inner cylinder of a center shaft 1 made of cylindrical shaft, and an adjusting knob 3 is inserted into an outer cylinder of the center shaft 1, and a horizontal through hole 4 is formed in the center shaft 1, and the lever cam 2 and the adjusting knob 3 are connected by set screw 5 by means of the horizontal through hole 4 of the center shaft 1, and a screw thread portion 8 of a lever shaft 7 is screwed to a screw thread portion 6 formed in an inner cylinder of the lever cam.

The center shaft 1 is formed with a flange portion 9 at its upper end, and a screw thread portion 10 is formed on its lower end portion of the inner cylinder, and top and bottom bearing members 12 and 12' of the binocular bodytubes 11 and 11' are pivotally provided, and a set screw 13 is screwed to the screw thread portion 10.

The lever cam 2 is formed as a cylindrical shaft, and the screw thread portion 6 is provided from the upper end to the lower part of the inner cylinder, and a set screw hole 14 is formed on the lower part of the lever cam 2 for screwing the set screw 5. The screw thread portion 6 of the lever cam 2 is preferably made to advance by 30 millimeters in one rotation, namely, 30 millimeters in one lead (for example, screw thread diameter 8 millimeter and lead angle 50 degrees, and 12-thread screw thread), and the wave crest angle is 60 degrees. This lever cam 2 is cast by the cast molding.

The lever shaft 7 is formed with a flange portion 17 for supporting connecting levers 16 and 16' of eyepiece lens cylinders 15 and 15', and the screw thread portion 8 of the lower part is formed with a lead screw thread corresponding to the screw thread portion 6 of the lever cam 2, and is screwed to the screw thread portion 6 of the lever cam 2.

Figure 4:
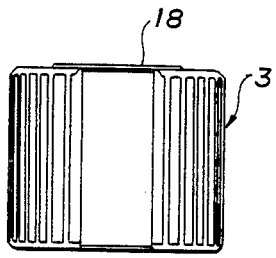
FIG. 4 is an elevational view of the adjusting knob.
Figure 7:
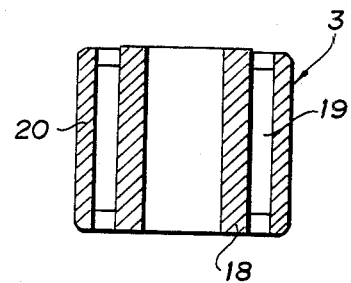
FIG. 7 is its vertical cross sectional elevational view.
Figure 5:
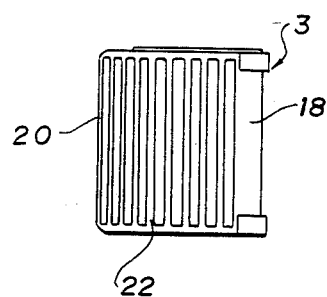
FIG. 5 is its right side views.
Figure 8:
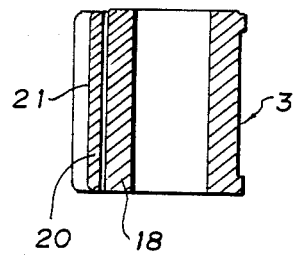
FIG. 8 is its cross sectional side view.
Figure 6:
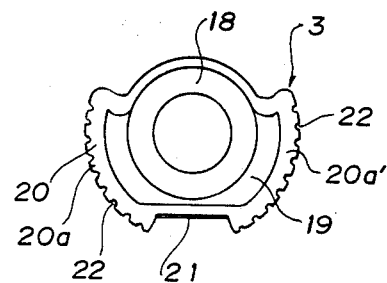
FIG. 6 is its plan view.

The adjusting knob 3 is constructed in such way as shown in FIGS. 4 through 6 that an annular portion 20 is provided on an outer extended portion of a cylindrical shaft portion 18 by providing a space 19 which covers about a half circumference of the outer extended portion, and this annular portion 20 is formed with a flat portion 21 of a predetermined width at the center portion of the front surface. Namely, the annular portion 20 is formed with circular portions 20a and 20a' at right and left by sandwiching the flat portion 21, and a plurality of slots 22 are formed on the surface of the outer periphery of the circular portions 20a and 20a' to stop the turning. Also, the flat portion 21 is preferably formed in concave surface shape.

Accordingly, when the adjusting knob 3 is rotated, the lever cam 2 that is integrally connected to the adjusting knob 3 by means of the set screw 5 rotates interlockingly. Since the screw thread portion 6 of the lever cam 2 and the screw thread portion 8 of the lever shaft 7 are screwed, the lever shaft 7 is caused to shift vertically by being accompanied by the rotational motion of the lever cam 2.

As the lever cam 2 is formed as the cylindrical shaft, it can be formed by the cast molding, and as a result, 12-thread can be easily formed with lead 30 millimeters, for example, lead angle 50 degrees in the inner cylinder of the lever cam 2. As described in the foregoing, the focus adjustment can be carried out by slightly turning the adjusting knob 3 with the lever cam 2 provided with the screw thread portion 6 advancing by 30 millimeters in one rotation, and moreover, not only the smooth operation of the vertical shifting of the lever shaft 7 becomes possible by the use of the lead screw thread, but also, the fixing and holding of the lever shaft 7 becomes positive thereby assuring the once set focus from the out of order.

As described in the foregoing, this invention is to provide a focus adjusting device employing the screw thread mechanism, and this focus adjusting device materializes the formation of the screw thread portion advancing by 30 millimeters in one rotation on account of the use of the lead cam of the structure that can be formed by the cast molding, and by mere turning of the adjusting knob, the adjustment of the focus can be carried out and the fixing and holding of the focus assures simply the focusing, namely, eliminating dropping of the eyepiece lens cylinder or the occurrence of out of focus by mere contact with the face of the user during the observation or moving of the eyepiece lens cylinder when the bodytube of the binocular is moved, and moreover, the operation of the lever shaft in the focus adjustment becomes extremely smooth, which are the advantageous points of this invention.

What is claimed is:

1. A focus adjusting device for a binocular, comprising
   (a) a cylindrical tubular center shaft member for supporting right and left body tubes, said center shaft member containing a horizontal through slot in its lower portion;
   (b) a cylindrical tubular lever cam member arranged within said center shaft member, said lever cam member including a screw thread portion on its inner cylindrical surface and containing a through hole in its lower portion, which through hole is aligned with the through slot contained in said center shaft member;
   (c) an adjusting knob surrounding said center shaft member and including a set screw aligned with and extending through the through slot and through hole to interlockingly connect said adjusting knob with said lever cam member; and
   (d) a lever shaft member for supporting eyepiece lens cylinders, the lower portion of which lever shaft member extends within said center shaft member, said lever shaft including on its lower surface a screw thread portion screw-threaded to the screw thread portion of said lever cam member.

2. A focus adjusting device for a binocular according to claim 1, wherein the screw thread portion included on the inner cylindrical surface of the lever cam member is formed with a lead screw thread advancing by about 30 millimeters in one rotation.

3. A focus adjusting device for a binocular according to claim 1, wherein the screw thread portion of the lever cam member comprises a screw thread diameter of 8 millimeters and a lead angle of 50 degrees, and further wherein the thread of the screw thread is 12 threads.

4. A focus adjusting device for a binocular comprising
   (a) a cylindrical tubular center shaft member for supporting right and left body tubes, said center shaft member containing a horizontal through slot in its lower portion;
   (b) a cylindrical tubular lever cam member arranged within said center shaft member, said lever cam member including a screw thread portion on its inner cylindrical surface and containing a through hole in its lower portion, which through hole is aligned with the through slot contained in said center shaft member;
   (c) an adjusting knob including an inner cylindrical shaft portion surrounding said center shaft member and an outer portion, approximately one-half of the circumference of the outer portion being spaced from the cylindrical shaft portion to provide an annular portion, the center area of the annular portion being formed as a flat surface of a predetermined width, said adjusting knob further including a set screw aligned with and extending through the through slot and through hole to interlockingly connect said adjusting knob with said lever cam member; and
   (d) a lever shaft member for supporting eyepiece lens cylinders, the lower portion of which lever shaft member extends within said center shaft member, said lever shaft including on its lower surface a screw thread portion screw-threaded to the screw thread portion of said lever cam member.

* * * * *